US012743771B2

(12) United States Patent
Zhang et al.

(10) Patent No.: US 12,743,771 B2
(45) Date of Patent: Sep. 22, 2026

(54) APPARATUS FOR INSPECTING BLOOD CULTURE BOTTLES USING IMAGING

(71) Applicant: AUGUSTA SPINCO CORPORATION, Milford, MA (US)

(72) Inventors: Jingyun Zhang, Freeland, MD (US); Ammon David Lentz, York, PA (US)

(73) Assignee: Augusta SpinCo Corporation, Milford, MA (US)

( * ) Notice: Subject to any disclaimer, the term of this patent is extended or adjusted under 35 U.S.C. 154(b) by 65 days.

(21) Appl. No.: 18/280,983

(22) PCT Filed: Mar. 9, 2022

(86) PCT No.: PCT/US2022/019437
§ 371 (c)(1),
(2) Date: Sep. 8, 2023

(87) PCT Pub. No.: WO2022/192324
PCT Pub. Date: Sep. 15, 2022

(65) Prior Publication Data

US 2024/0153074 A1 May 9, 2024

Related U.S. Application Data

(60) Provisional application No. 63/159,226, filed on Mar. 10, 2021.

(51) Int. Cl.
*G01N 21/01* (2006.01)
*C12M 1/34* (2006.01)
(Continued)

(52) U.S. Cl.
CPC .. *G06T 7/0012* (2013.01); *G06T 2207/30004* (2013.01)

(58) Field of Classification Search
CPC ........ G06T 7/0012; G06T 2207/30004; G01N 21/01; G01N 21/90; G03B 37/005; C12M 41/36
See application file for complete search history.

(56) References Cited

U.S. PATENT DOCUMENTS 5,498,543 A 3/1996 Berndt
5,516,692 A 5/1996 Berndt
(Continued)

FOREIGN PATENT DOCUMENTS

CN 102144187 A 8/2011
CN 204638580 U 9/2015
(Continued)

OTHER PUBLICATIONS

International Search Report and Written Opinion for Application No. PCT/US22/19437 dated Jun. 22, 2022 (11 pages).
(Continued)

*Primary Examiner* — Siamak Harandi
(74) *Attorney, Agent, or Firm* — Botos Churchill IP Law LLP

(57) ABSTRACT

An imaging module to obtain an image of an entire bottle in one image frame. The imaging module places the bottle in an auxiliary mirror module (AMM). The module has a quasi-conical shaped mirror which offers a reflection of the bottle placed in the AMM. That reflection is the source of an
(Continued)

image obtained by an imaging assembly. The imaging assembly can be a lens/camera assembly or a photo sensor that will detect photo fluorescence.

27 Claims, 12 Drawing Sheets

(51) Int. Cl.
*G01N 21/90* (2006.01)
*G06T 7/00* (2017.01)

(56) References Cited

U.S. PATENT DOCUMENTS

| | | | |
|---|---|---|---|
| 5,661,294 A | 8/1997 | Buchmann et al. | |
| 5,817,508 A | 10/1998 | Berndt | |
| 6,072,575 A | 6/2000 | Loell | |
| 9,365,814 B2 | 6/2016 | Bachur et al. | |
| 2006/0259195 A1 | 11/2006 | Eliuk et al. | |
| 2008/0013820 A1* | 1/2008 | Vertoprakhov | G06T 7/0004 382/141 |
| 2010/0060773 A1 | 3/2010 | Baldwin | |
| 2014/0333760 A1 | 11/2014 | Vertoprakhov et al. | |

FOREIGN PATENT DOCUMENTS

| | | | |
|---|---|---|---|
| CN | 111144396 A | | 5/2020 |
| CN | 111914823 A | | 11/2020 |
| JP | 2008310783 A | | 12/2008 |
| JP | 2019045470 A | | 3/2019 |
| WO | WO 0205011 | * | 1/2002 |
| WO | 2009066165 A1 | | 5/2009 |
| WO | 2017196193 A1 | | 11/2017 |

OTHER PUBLICATIONS

Extended European Search Report for European Patent Application No. 22767845.5, Jan. 22, 2025, 1-9.
Article 94(3) Communication issued in European Patent Application 22767845.5 on Jun. 25, 2026, pp. 7.
First Office Action issued in Chinese Invention Patent Application No. 2022800194917 on Jun. 27, 2026, pp. 28.

* cited by examiner

540a'
+37°
540b
-37°
540a'
±45°
550
515

540b
+35°
-35°
540a''
±45°
540a''
550
515

540a
+45°
540b
-45°
540a
±45°
550
515

APPARATUS FOR INSPECTING BLOOD CULTURE BOTTLES USING IMAGING

CROSS-REFERENCE TO RELATED APPLICATIONS

The present application is a national phase entry under 35 U.S.C. § 371 of International Application No. PCT/2022/019437 filed Mar. 9, 2022, published in English, which claims priority from U.S. Provisional Application Ser. No. 63/159,226 filed Mar. 10, 2021, the disclosures of which are incorporated by reference herein.

TECHNICAL FIELD

Presently described is an apparatus that obtains a single image of a blood culture bottle from which information such as label information and fill level can be obtained.

BACKGROUND

The presence of biologically active agents such as bacteria in a patient's body fluid, especially blood, is generally determined using blood culture bottles. A small quantity of blood is injected through an enclosing rubber septum into a sterile bottle containing a culture medium, and the bottle is then incubated at about 35° C. and monitored for microorganism growth. Microbial growth is detected by a change in the blood culture over time that is an indication of microbial growth. Typically, parameters such as the concentration of carbon dioxide or oxygen in the culture bottle headspace or a change in pH are monitored for changes over time that are indicative of microbial growth.

Since it is of utmost importance to learn if a patient has a bacterial infection, hospitals and laboratories have automated apparatus that can process many blood culture bottles simultaneously. One example of such an apparatus is the BD BACTEC™ system, which is manufactured and sold by Becton, Dickinson and Co. U.S. Pat. No. 5,817,508 to Berndt et al. describes a prior art blood culture apparatus, and is incorporated by reference herein. Additional descriptions of Blood Culture Apparatus are provided in U.S. Pat. No. 5,516,692 ("Compact Blood Culture Apparatus") and U.S. Pat. No. 5,498,543 ("Sub-Compact Blood Culture Apparatus") both of which are incorporated by reference herein.

It is critical to ensure that the presence or absence of a blood stream infection (BSI) is correctly determined. Patients and their caregivers are placed at risk if a BSI goes undetected. It is well known that overfilling a blood culture bottle with the blood sample can lead to false positives. It is well known that underfilling blood culture bottles with the blood sample can lead to false negatives. This is because the sample removed from the patient has a certain, but unknown, concentration of bacteria (if bacteria is at all present). Therefore, in the case of underfill, a lower bacteria count is present in the blood culture bottle at time zero than if the culture bottle had been filled with the target sample amount. It follows then that, in the case of overfill, a higher bacteria count is present in the blood culture bottle at time zero than if the culture bottle had been filled with the target sample amount. If a bottle is underfilled or overfilled, algorithms can be applied to the measured changes in carbon dioxide or oxygen concentration or pH to adjust for underfill or overfill. If the underfill or overfill exceeds a certain specification, the blood culture bottles are discarded. This is described in U.S. Pat. No. 9,365,814 which issued on Jun. 14, 2016 and is incorporated by reference herein.

Therefore, when processing blood culture bottles in a laboratory environment that is processing a large number of blood culture bottles, there is a need to be able to monitor the fill condition of each bottle accurately. Other information about the blood culture, such as the label information, is also collected. Consequently, methods and apparatus that can accurately obtain fill information and label information from a blood culture bottle continue to be sought.

BRIEF SUMMARY

Described herein is a system for obtaining an image of a cylindrical object. The system includes a camera and a bracket for holding the camera in place to obtain an image of the cylindrical object (e.g., a blood culture bottle). The system also includes a conically-shaped receptacle comprising a mirrored interior surface, the conically shaped receptacle adapted to receive the cylindrical object. The camera is positioned such that it can capture an image of the cylindrical object when held in the conically-shaped receptacle. In some embodiments, the system includes a bracket supporting the conically-shaped receptacle, wherein the bracket has an opening through which the cylindrical object can pass.

As noted above, the cylindrical object is a bottle in some embodiments. In some embodiment, the bottle is a blood culture bottle. Optionally, the cylindrical object has a label thereon. In some embodiments, the camera obtains an image of the label in a single frame. In an automated embodiment, the camera is in communication with a processor. In one embodiment, the processor is programmed to apply a polar transform to the image information received from the camera. In those embodiments that include a processor, the processor outputs a transformed image from the application of the polar transform.

Also described herein is a method for obtaining an image of a cylindrical object, such as a bottle (e.g., a culture bottle). According to the method, the cylindrical object is positioned in a conically-shaped receptacle, wherein the conically-shaped receptacle has a mirrored interior surface. A digital image of the cylindrical object as reflected from the mirrored surface of the conically-shaped receptacle is obtained by a camera and that image is transmitted to a processor. The processor applies a polar transform to the digital image and the transformed image is outputted for analysis. In one embodiment, the bottle has a label thereon. In this configuration, an image of the entire circumference of the cylindrical object is obtained in one frame.

BRIEF DESCRIPTION OF DRAWINGS

The foregoing and other objects and advantages will be apparent upon consideration of the following detailed description, taken in conjunction with the accompanying drawings, in which like reference characters refer to like parts throughout and in which.

DETAILED DESCRIPTION

Figures 1A, 1B:
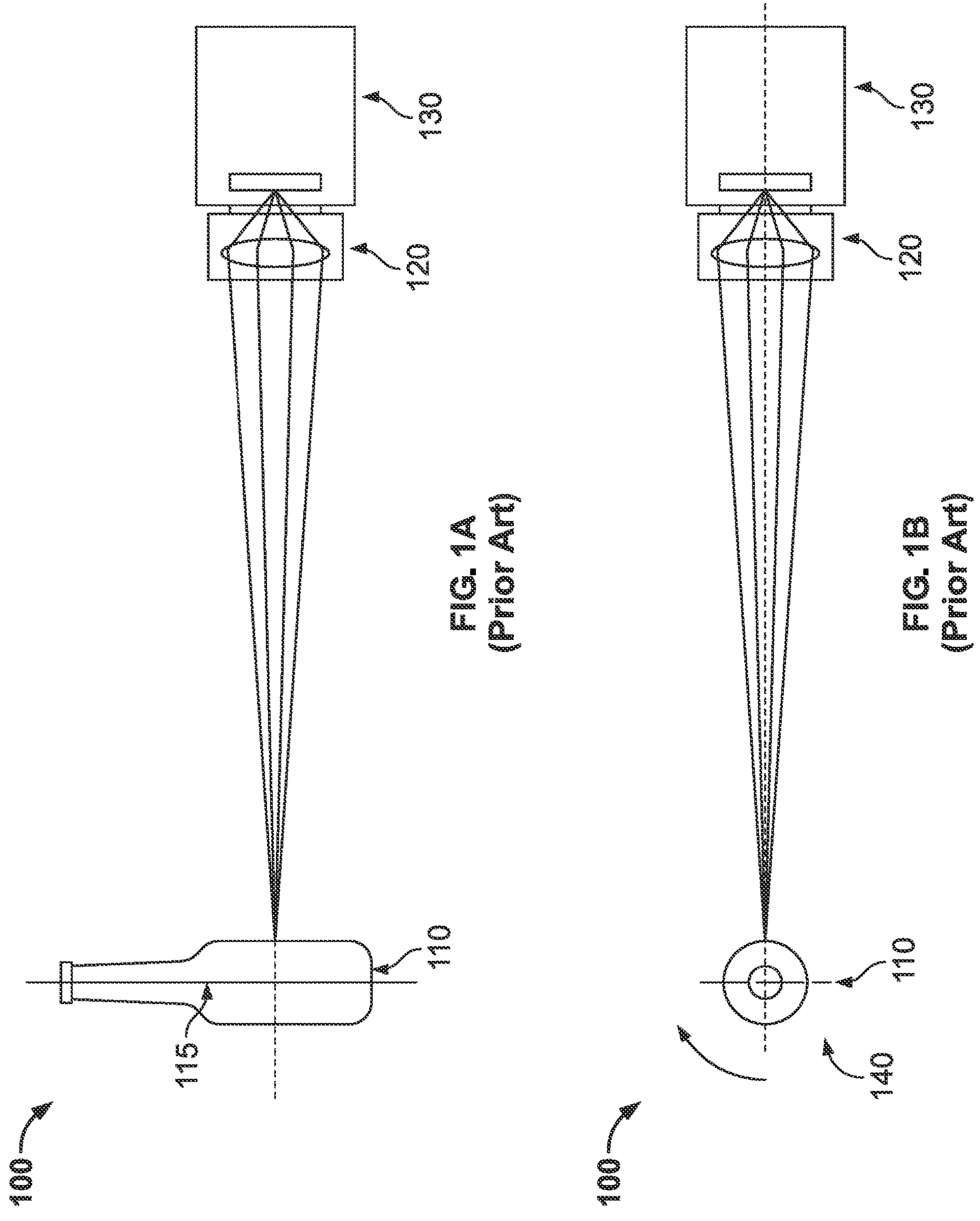
FIG. 1A is a schematic side view of a system for obtaining an image of a blood culture bottle.
FIG. 1B is a schematic top view of the system illustrated in FIG. 1A.

Embodiments of the present disclosure are described in detail with reference to the drawing figures wherein like reference numerals identify similar or identical elements. It is to be understood that the disclosed embodiments are merely examples of the disclosure, which may be embodied in various forms. Well-known functions or constructions are not described in detail to avoid obscuring the present disclosure in unnecessary detail. Therefore, specific structural and functional details disclosed herein are not to be interpreted as limiting, but merely as a basis for the claims and as a representative basis for teaching one skilled in the art to variously employ the present disclosure in virtually any appropriately detailed structure.

Described herein is an imaging system for obtaining an image of a blood culture bottle that can be used to obtain information such as label information, fill level, etc. In one particular aspect, the system described herein relates to an apparatus that can obtain one single image of the entire cylindrical body of a blood culture bottle. From that image, information such as the complete label information on the bottle and the liquid height level in the bottle can be obtained.

Referring to FIG. 1A, the system 100 of the prior art obtains an image of a cylindrical body that is illustrated as a blood culture bottle 110. The blood culture bottle 110 has a curved surface spanning 360° in the horizontal plane of the imaging apparatus 100. Such systems can obtain a full image of the whole cylindrical body of a blood culture bottle in one of two ways.

A simple imaging system of a lens 120 and a camera 130 obtains an image of the bottle 110. Although not shown to scale, FIG. 1 illustrates that the distance between the system and the bottle is not much greater than the length of the bottle 110. The bottle 110 is rotated around its vertical axis 115. A series of images is obtained as the bottle 110 is rotated about its axis. While the number of images might vary, one series of images for one period of a complete rotation of the bottle might number about 24 to 48 or more frames. Each image frame is communicated to an image processing apparatus to stitch together a central portion of each frame of images. From this, a full image of the whole cylindrical body of the bottle is recovered. FIG. 1B is a top view of the system of FIG. 1A. The rotating platform 140 on which the bottle 110 is placed for rotation is illustrated in FIG. 1B. A system for obtaining an image of a blood culture bottle on a rotating platform is described in U.S. Pat. No. 10,395,357, which issued on Aug. 27, 2019 and is incorporated by reference herein. The image is obtained to detect the presence of foam in the containers.

In an alternate approach to that illustrated in FIG. 1A and FIG. 1B, multiple instances of a lens/camera assembly may be positioned around the circular bottle. The number of lens/camera assemblies can vary. For example, to obtain a complete image of the circular bottle, twelve, sixteen, or even more lens/camera assemblies may be positioned encircling the bottle. The bottle is positioned in the center of the annular imaging zone defined by the lens/camera assemblies encircling the zone. Each lens/camera assembly obtains a discrete frame of an image of the entire bottle. The assembly then communicates the frame to an image processing module that stitches the image together using the center portion of each image frame.

Figure 2:
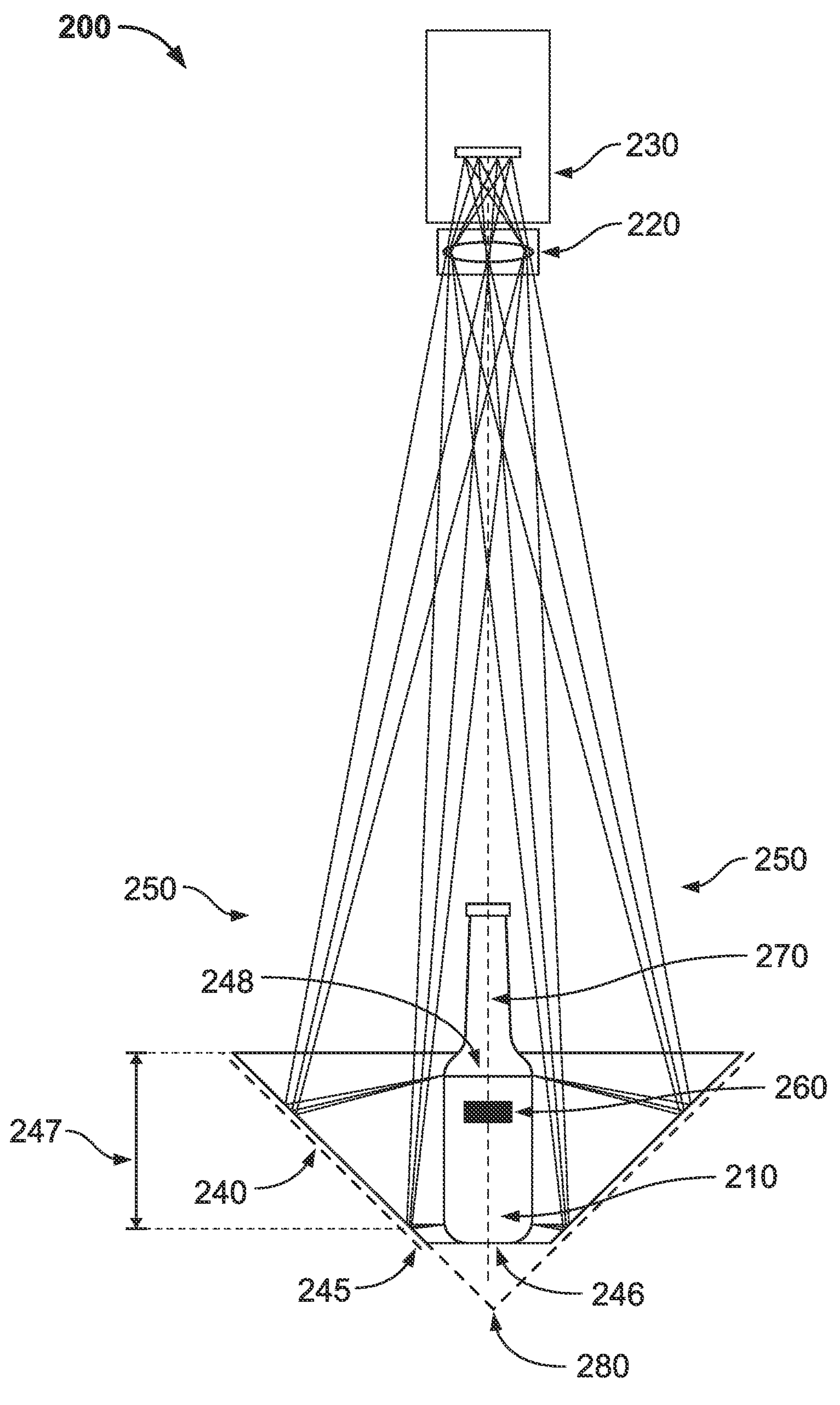
FIG. 2 is a schematic view of one embodiment of the system described herein.

With reference to FIG. 2, the system 200 is a departure from the prior art system illustrated in FIG. 1A and FIG. 1B in that the system does not have or require a rotating platform or multiple lens/camera assemblies to obtain a 360° image of a cylindrical object such as a blood culture bottle. The system deploys what is referred to herein as an Auxiliary Mirror Module (AMM) in cooperation with a simple imaging system consisting of a lens 220 and a camera 230.

Figure 3:
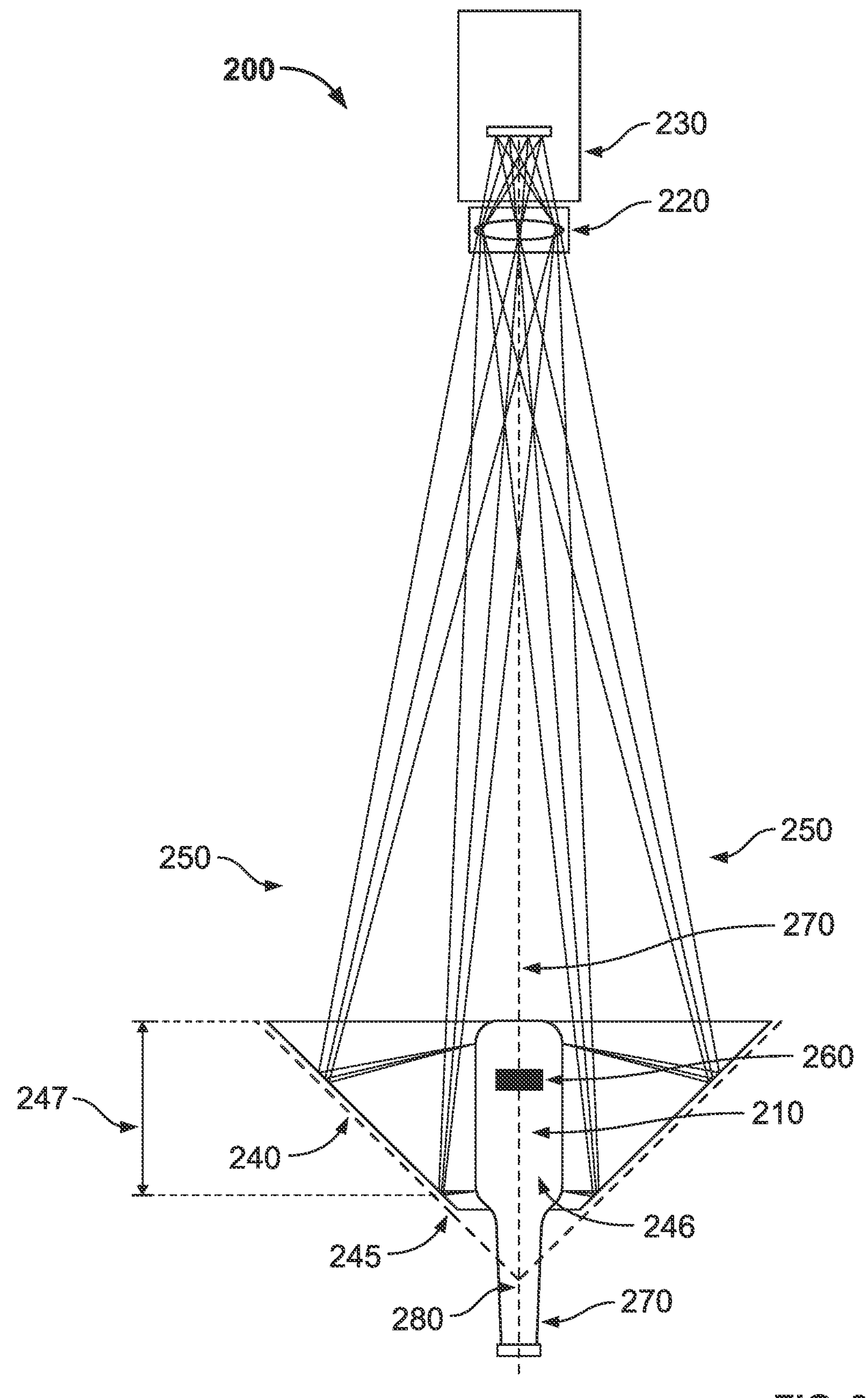
FIG. 3 is a schematic view of an alternative embodiment of the system described herein.

Referring again to FIG. 2, it is important to note that the bottle 210 is not required to be upright (i.e., as illustrated in FIG. 2, the bottom of the bottle 210 is proximal to the extrapolated apex 280 to measure the bottle fill or to read the label 260). The bottle 210 may be positioned on its side for imaging. Also, the bottle 210 may be positioned upside down so that the neck 270 of the bottle 210 is proximal to the apex of the AMM. The orientation of the bottle during imaging depends somewhat on the information being sought. If the objective is to obtain both the label information from the image and the fill level of the bottle, the bottle needs to be positioned upright. If the only information sought is the label image, the bottle can be positioned on its side, upside down, etc. The apex, 280, is extrapolated from the tapered sides of the AMM 240. As illustrated in FIG. 3, the bottle 210 may be positioned so that its neck 270 may be proximal to the apex of the AMM. The system 200 deploys an AMM 240 that provides for three-dimensional (3D) optical path folding. The AMM module is configured as a mirrored conical structure that reflects the bottle 210 as illustrated by rays 250. Rays 250 indicate how the bottle's reflection in the AMM is received by the lens/camera assembly 220/230. The bottle 210 is placed at the center of the AMM and imaged by the camera through the folded path 250. By working in this specific way, an image of the entire bottle is captured in a single image frame. The image of the bottle 210 that is received by the camera sensor is a deformed image due to the nature of the bottle reflection transmitted by the AMM. However, no image stitching is required, although image processing is required to obtain a true image of the bottle from what is reflected by the AMM. The fact that no image stitching is required and no bottle rotation is required are advantages over prior art systems that obtain an image of a blood culture bottle.

Referring to FIG. 2, the AMM 240 is a special reflective mirror having a funnel shape, or conical shape, which is defined by a few parameters. The cone angle, defined at extrapolated apex 280, is 90° for the embodiment illustrated in FIG. 2. The AMM has a small circular opening 246 in a bottom 245 of the AMM that has a diameter that is slightly larger than that of the bottle 210. The AMM has a height 247 that is slightly higher than the body portion of the bottle 210. That is, most of the neck 270 of the bottle 210 extends above the AMM in the embodiment illustrated in FIG. 2. As illustrated by rays 250, the AMM provides path-folding of the reflected image of the bottle 210 in a 3D manner from every point on the portion of the bottle positioned within the AMM, to the imaging camera, forming point-to-point images. Consequently, an image of the entire bottle 210 is obtained in one frame.

Referring to FIG. 3, the system is identical to that of FIG. 2 except the neck 270 of the bottle 210 is inserted through the opening 246 of the AMM. Because the bottle 210 is to be supported by an associated holding mechanism, the bottle 210 can be positioned as illustrated, which is a vertical orientation. For purposes of determining the fill level of the bottle, it is preferred to have the bottle 210 held in a bottom down vertical orientation. While the AMM would provide an image of the bottle even if the bottle was held in a horizontal position, for level sensing the measurement is more precise if the bottle is in a vertical orientation.

In one embodiment, the bottle 210 is equipped with a fill line 248 (FIG. 2). The fill line 248 serves as a reference to determine, from the image, if the bottle is precisely filled, overfilled or underfilled. In one embodiment, the fill line can be provided on the label.

The AMM described herein provides several advantages over other systems that obtain an image of a culture bottle. As noted above, there is no need to move (i.e., rotate) the bottle. For level sensing, it is advantageous if the bottle remains still for imaging. Also, only one lens/camera assembly is required, reducing the cost and complexity of the system. As noted above, only one frame is required to obtain an image of the entire bottle reducing image processing complexity. Specifically, it is less complicated to obtain a single image of a label and remediate image distortion caused by the curvature of the bottle than to stitch multiple discrete images of the label together to obtain an image of an undistorted (i.e., "flat") label.

Figure 4B:
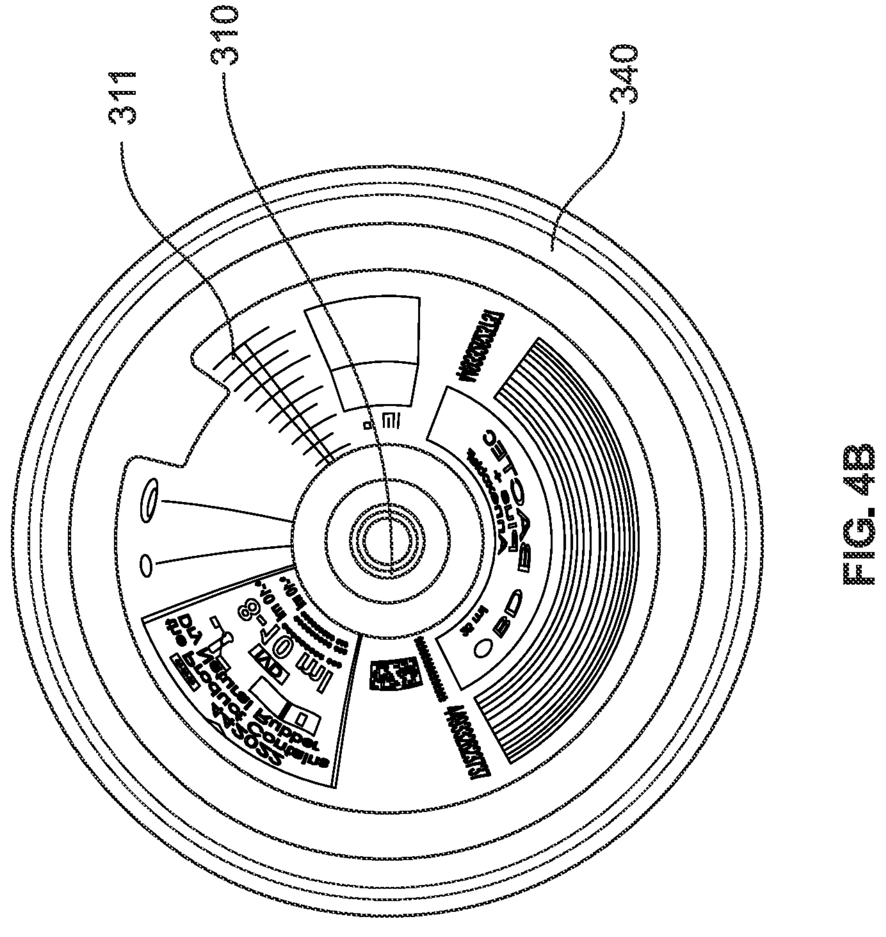
FIG. 4B is an image of the blood culture bottle illustrated in FIG. 4A, the image having been obtained using a system as illustrated in FIG. 2.
Figure 4A:
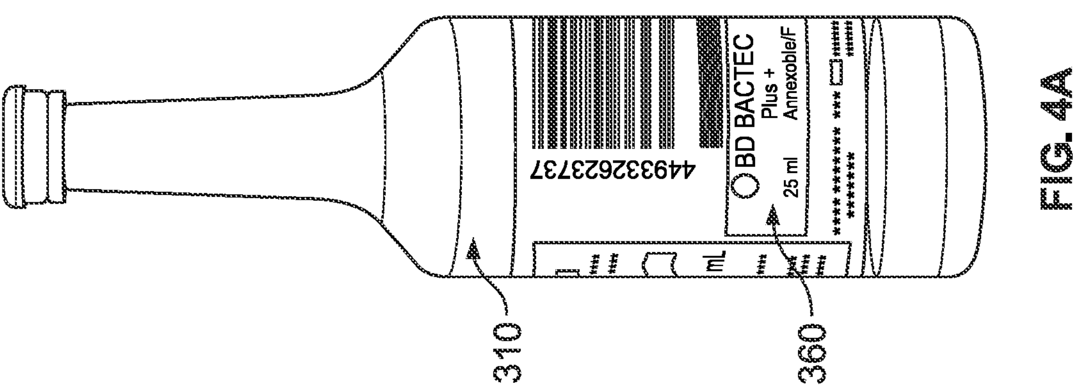
FIG. 4A is a blood culture bottle that is placed in the system described herein to obtain an image thereof.

FIG. 4A is an image of a bottle 310 with the label 360 thereon. FIG. 4B illustrates an image 311 of the bottle 310 placed in the AMM 340. The AMM 340 is a mirrored conical receptacle as illustrated in FIG. 2 and FIG. 3. The bottle 310 is positioned such that the bottom of the bottle is proximal to the apex of the conical shape defined by the AMM 340. The deformed image 311 illustrated in FIG. 4B has an outer zoning region that has a higher pixel density (or resolution) than that in the inner zoning region. One way to control or to balance the Region of Interest (ROI) on the final image, is to take the image of the bottle with the neck proximal to the apex of the AMM illustrated in FIG. 3. When the neck is extending from the AMM in this manner, the neck can be held by a robot (not shown). Since the robot is positioned on the side of the AMM away from the lens/camera assembly, the robot is outside the optical path from the AMM to the lens/camera assembly.

Figure 4C:
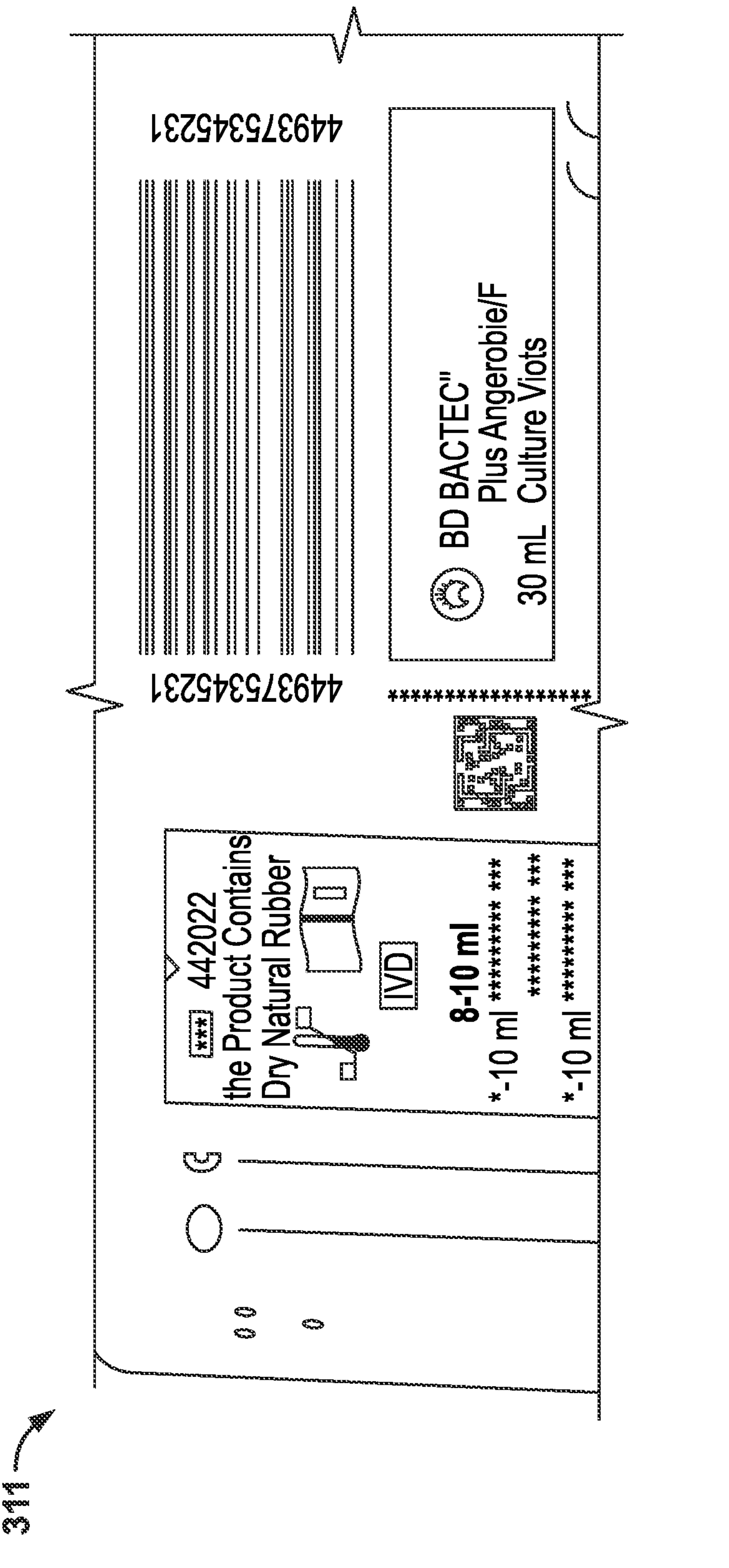
FIG. 4C is a polar transform of the image illustrated in FIG. 4B.

FIG. 4C is a polar transform of the image illustrated in FIG. 4B. Techniques for forming a rectangular image from a circular image using a log-polar transform are described in U.S. Pat. No. 7,961,982 to Sibiryakov, et al., which is incorporated by reference herein. One example of suitable polar transform equations is:

$$X = r\sin(\varphi) \tag{1}$$

$$Y = r\cos(\varphi) \tag{2}$$

where r is the distance from the origin in the plane. Such techniques are well-known to one skilled in the art and not described in detail herein.

As noted above, obtaining the image of the full label in the manner described herein is advantageous because it provides all of the data regarding the label in a single data set. The full-label image is deformedly formed in an annular area for image processing as illustrated in FIG. 4B. FIG. 4C illustrates the image of the label in FIG. 4B after the application of a polar transform. Because all of the data needed to process the image information is obtained in a single frame, data acquisition is faster. As noted above, there is no need to rotate the bottle, or the imaging apparatus, to obtain multiple images of a single label. Because there is no need to move the bottle during imaging, there is no imaging error associated with mechanical noise from vibration (which may cause movement of the bottle in the y axis). Imaging errors that might arise from axial runout (i.e., wobble) are also avoided. Imaging errors could also result if the bottle moves in the radial direction between two images, which could cause label image size variation between the two images. Also, obtaining a single image of the label allows a more accurate image to be obtained of a poorly applied label (i.e., a crooked label, a wrinkled label, etc.)

Figures 5A, 5B, 5C:
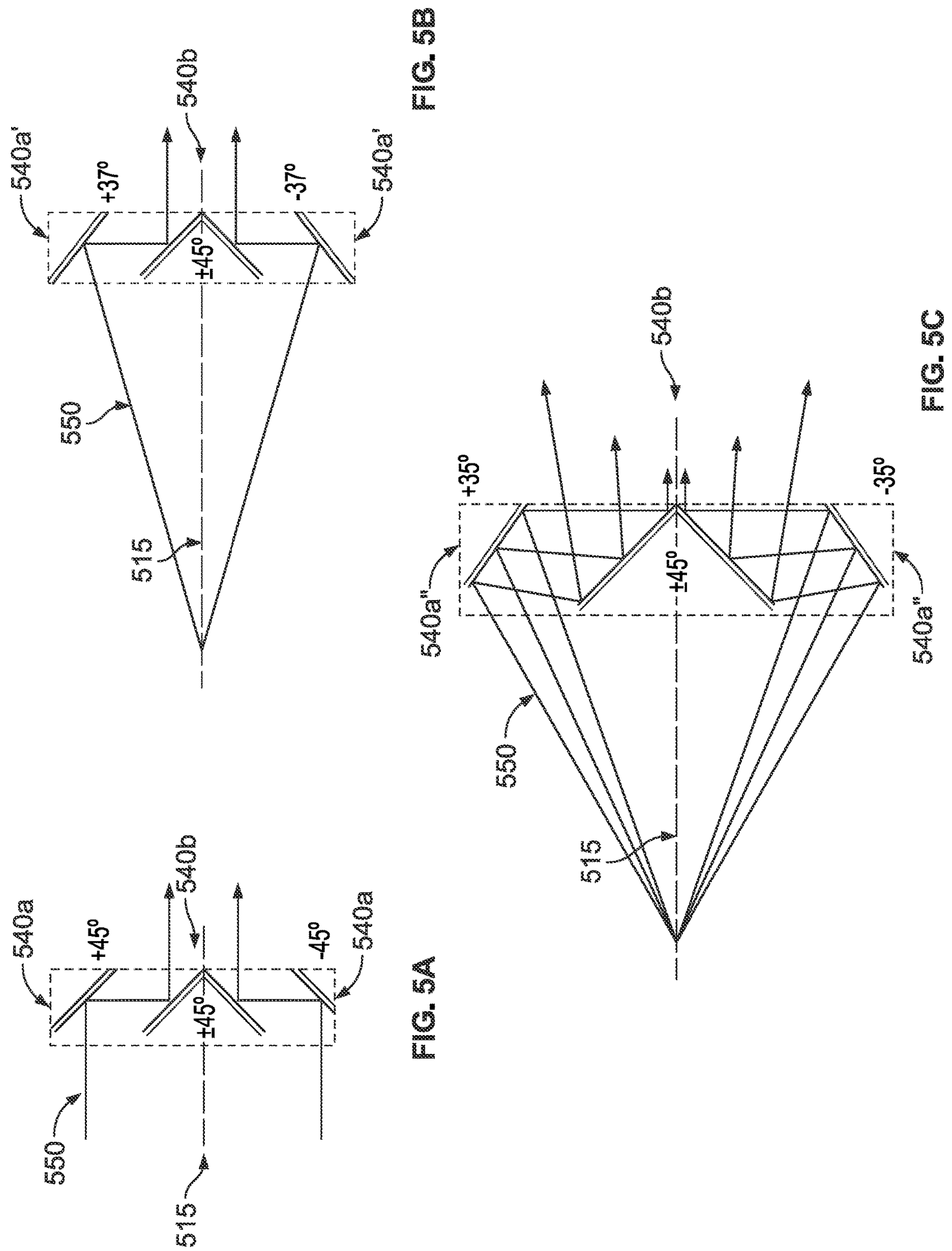
FIG. 5A-FIG. 5C are alternate configurations of AMM configurations.

Referring to FIG. 5A-5C, a few variations of types of AMM are illustrated. These AMMS do not provide for full bottle imaging. Rather, each of the AMMs support an enlarged field of view that captures more of the label in a single frame that can be captured in a single frame using the AMM of FIG. 1A. For example, the amount of the label obtained in a single image frame using the AMMs of FIG. 5A-FIG. 5C is about twice the amount of label obtained using an AMM that does not have the modifications illustrated in FIG. 5A-FIG. 5C. The field of view is approximately doubled in the AMMs illustrated in FIGS. 5A-FIG. 5C. FIG. 5A illustrates an AMM with two pairs of mirrors 540*a* and 540*b*, each of which is angled 45° relative to the horizonal line from the bottle axis 515. The optical path from the bottle (the bottle is not shown) to the lens/camera assembly (the lens/camera assembly is not shown) is illustrated by rays 550. FIG. 5B illustrates a variation of the AMM illustrated in FIG. 5A, in which the outer pair of mirrors 540*a*' are positioned at a 37° angle relative to the bottle axis 515. The optical path, characterized by rays 550, illustrates a wider field of view than the AMM illustrated in FIG. 5A.

FIG. 5C illustrates another variation of the AMM illustrated in FIG. 5A and FIG. 5B, in which the outer pair of mirrors 540*a*' are positioned at a 35° angle relative to the bottle axis 515. The optical path, characterized by rays 550, illustrates a wider field of view than the AMM illustrated in FIG. 5A and FIG. 5B.

Other techniques for obtaining "flat" images of bottle labels are known. Techniques that use a standard imaging device such as a camera phone or scanner are well-known and one description of such techniques is described in Slatcher, Steve, "How to create flat rectangular images of wine bottle labels," (Feb. 21, 2018) wineous.co.uk/wp/archives/11397.

Figure 6:
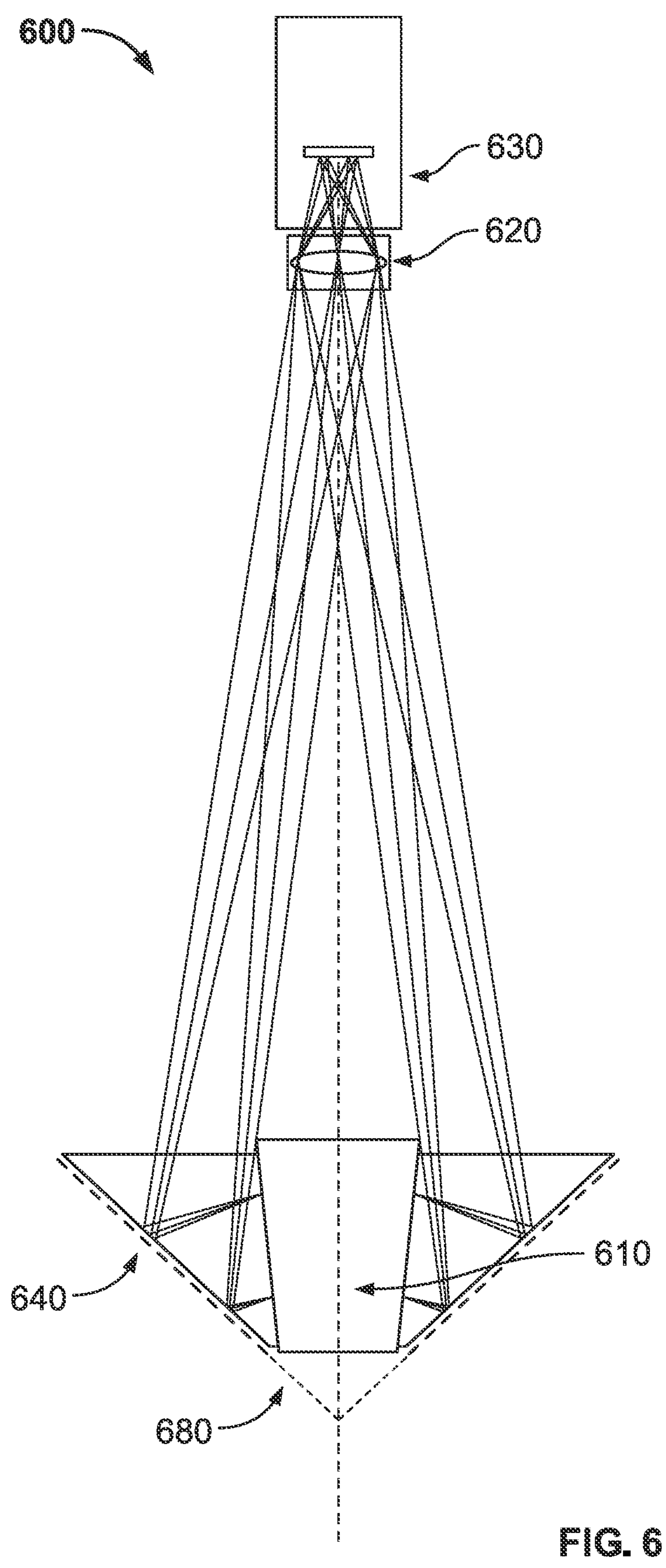
FIG. 6 is a schematic view of an alternative embodiment of the system described herein.

FIG. 6 illustrates a variation of the AMM illustrated in FIG. 2 and FIG. 3. The system 600 illustrated in FIG. 6 has a lens/camera assembly 620/630. In the FIG. 6 variation, the extended apex 680 of the AMM 640 forms an angle of 96°, which is a wider angle that provides a better reflected image of a tapered bottle 610.

Figure 7:
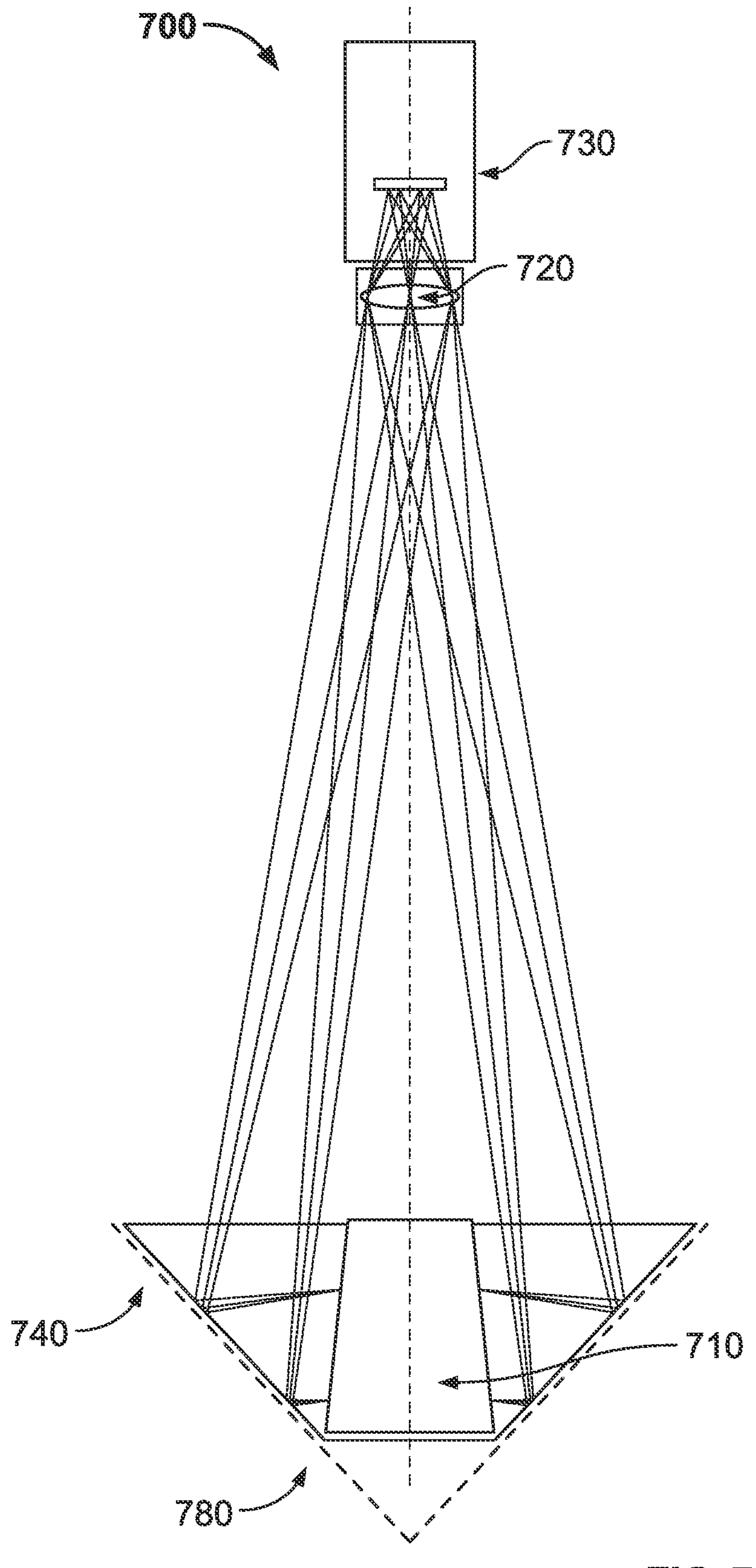
FIG. 7 is a schematic view of an alternative embodiment of the system described herein.

FIG. 7 illustrates a variation of the AMM illustrated in FIGS. 2 and 3. The system 700 illustrated in FIG. 7 has a lens/camera assembly 720/730. In the FIG. 7 variation, the extended apex 780 of the AMM 740 forms an angle of 84° which is a narrower angle that provides a better reflected image of a tapered bottle 710 in which the wider portion of the bottle is proximal to the apex 780.

The examples of the AMM described herein that use the conical mirror provide 3D Path-Folding that provides an image of the entire body of the blood culture bottle. In an alternative embodiment, the imaging system can be replaced by a fluorescence detecting system. In this alternative configuration, the camera is replaced by a photo sensor. An emission filter is placed in front of the sensor. In this embodiment, the bottle is illuminated by excitation light having shorter wavelengths (for example, a narrow band of wavelengths centered at 560 nm. Accordingly, the emission filter placed in front of the sensor is a longpass filter with cut-on wavelength at 635, nm, for example. In this embodiment the bottle can be replaced by a test tube or a cuvette. The test tube or cuvette will be placed in the AMM just as the bottle is placed in the AMM as described herein. The test tube or cuvette will be illuminated just as the culture bottle is illuminated as described above.

Figures 8A, 8B, 8C:
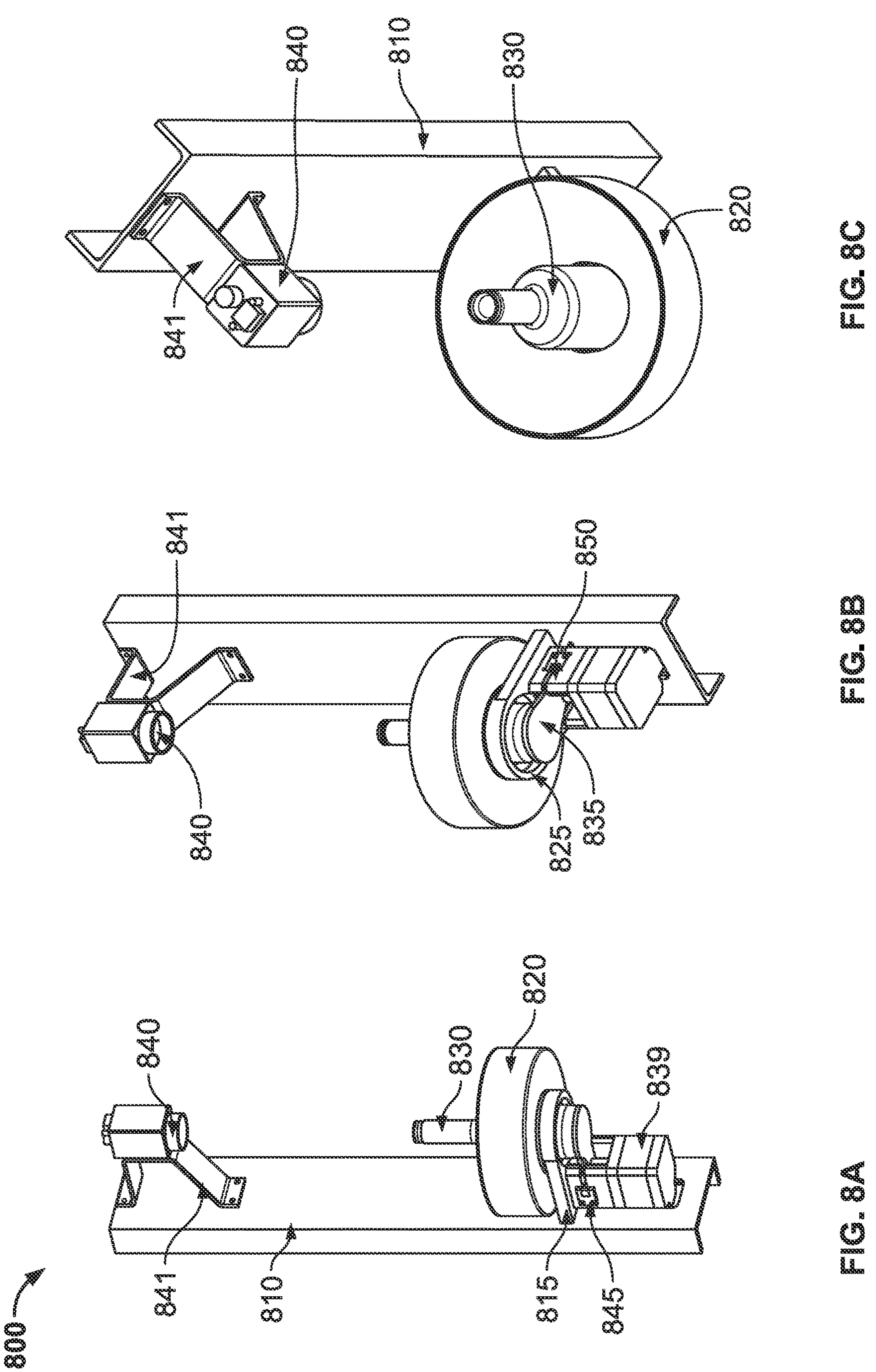
FIG. 8A-FIG. 8C are different perspective views of a conical mirror imaging module according to one embodiment described herein.

FIG. 8A-FIG. 8C illustrate an apparatus for receiving a bottle in a conical mirror for imaging. FIG. 8A is side perspective view of the apparatus 800 with support 810 for bracket 815 for holding the conical mirror 820 into which the bottle 830 is received for imaging. The bracket 815 has an opening 825 through which the bottle 830 will fit. A motor, 839, is fitted on the bracket 815 for moving the gate 835 from the closed position, which is illustrated in FIG. 8A-FIG. 8C and FIG. 9A, to the open position illustrated in FIG. 9B. Slotted optical switches, 845, 850 sense the open and closed positions of gate 835. The gate 835 is directly connected to a shaft (not shown) of the motor 840.

Positioned above the bracket 815 on support 810 is camera 840. Camera 840 is aimed downward to capture the image of a label (not shown) on the bottle 810. Camera 840 is affixed to support 810 by bracket 841. As described above, the conical mirror 820 allows for capture of an image of the entire label in one image, which is then processed by converting polar coordinates to cartesian coordinates, to yield an undistorted image of the label.

Figure 9A:
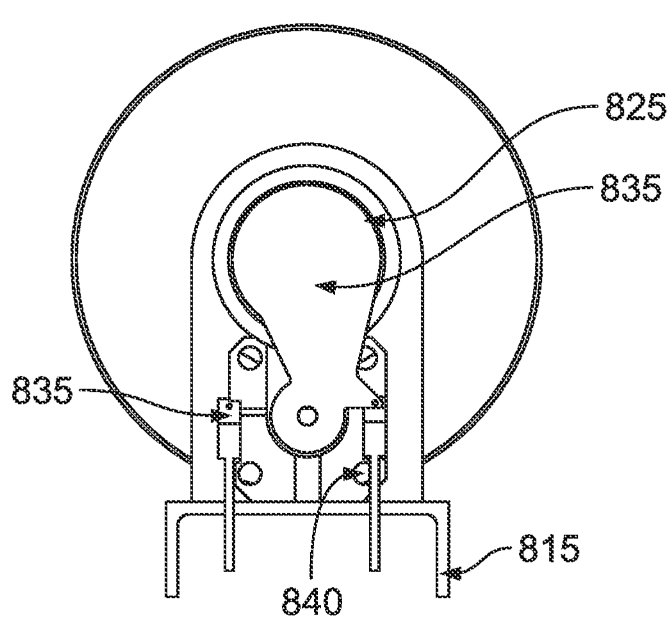
FIG. 9A and FIG. 9B are bottom views of the bracket illustrated in FIG. 8A-FIG. 8C.
Figure 9B:
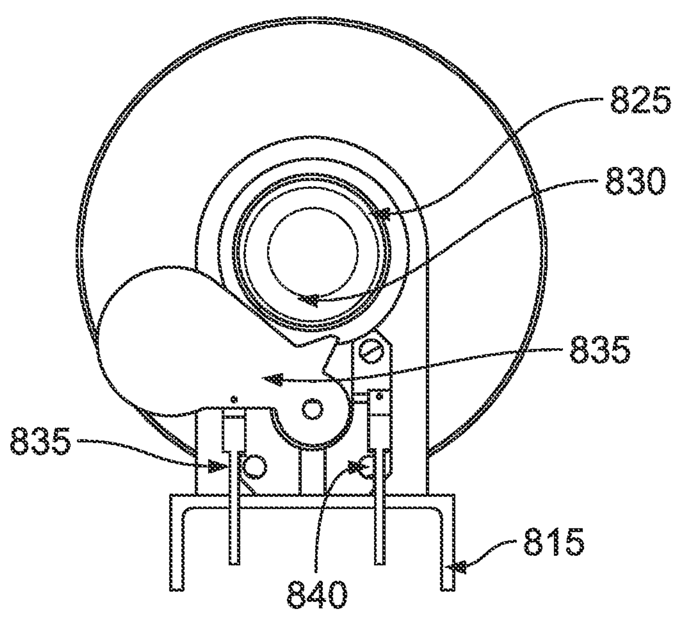

As illustrated in FIG. 9A, the bracket 815 has a gate 835 that supports the bottle 830 in the conical mirror 820 for imaging. When imaging is complete, the gate 835 is pivoted away as illustrated in FIG. 9B. Once the gate no longer covers the opening 825, the bottle 830 will drop from the bracket 815.

Figure 10B:
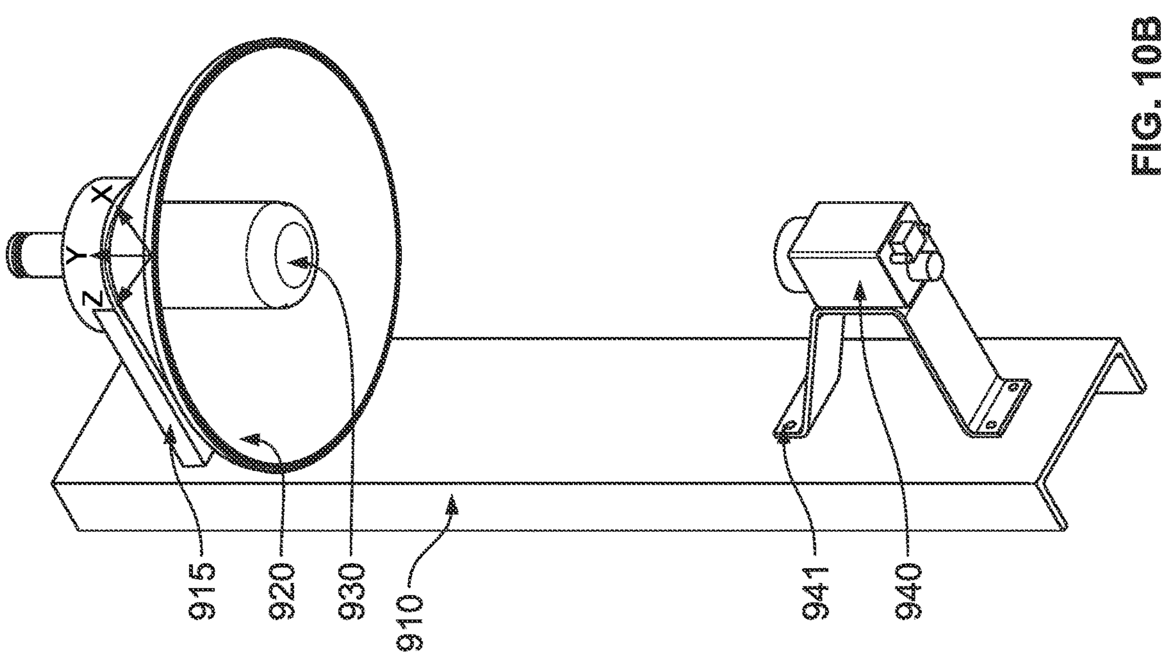
FIG. 10A-FIG. 10D are perspective and side views of a conical mirror imaging module according to a second embodiment described herein.
Figure 10A:
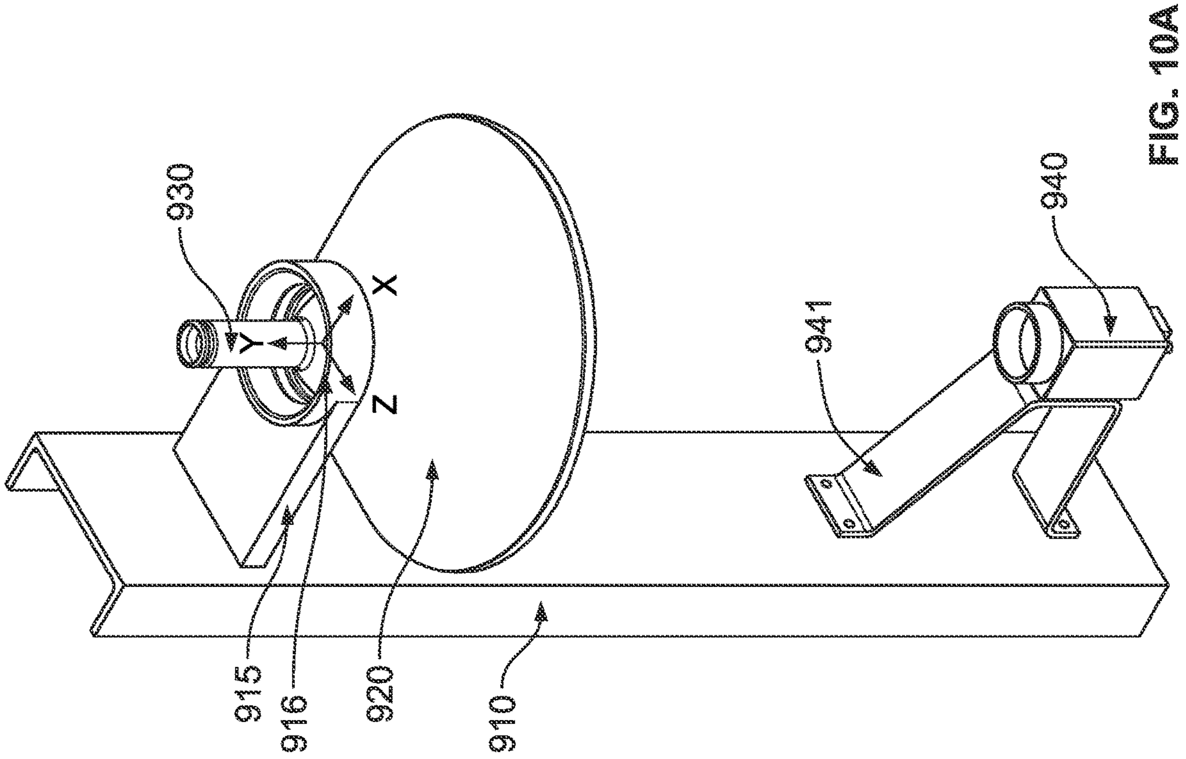
Figure 10D:
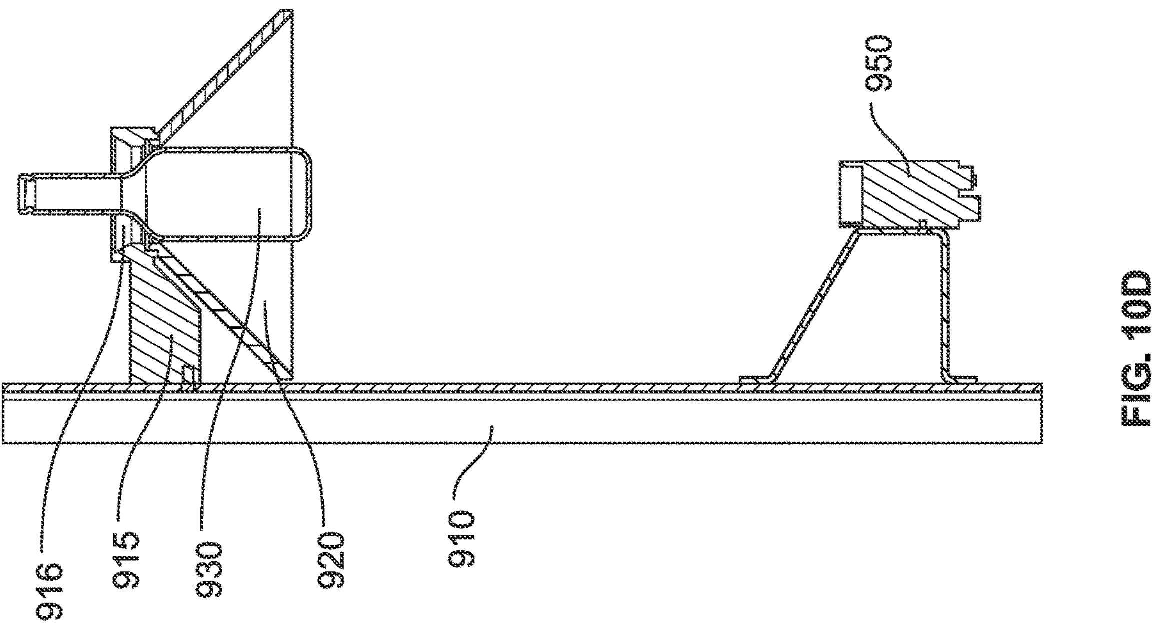
Figure 10C:
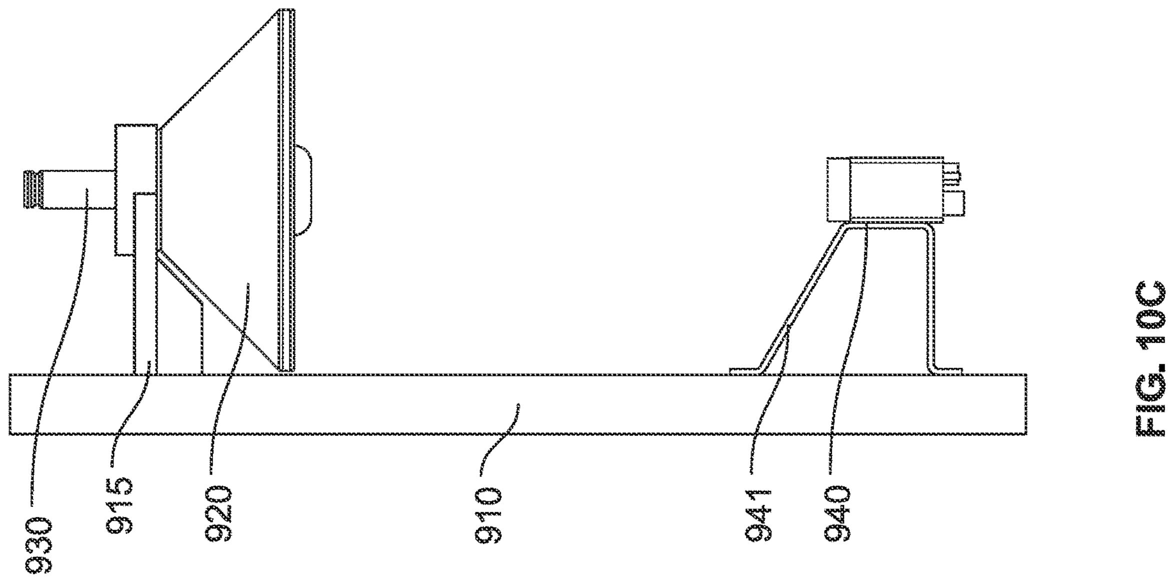

Referring to FIG. 10A-FIG. 10D, the conical mirror 920 is inverted and held by bracket 915 onto support 910. The bottle 930 is inserted through the opening 916 in bracket 915. In one aspect the bottle 930 is positioned into the conical mirror by a robotic arm (not shown) that holds the bottle 930 in place for imaging. One skilled in the art will appreciate that the bottle 930 is held in the conical mirror 920 by a number of different mechanical means. For example, the bracket 915 might be configured with a clamp that holds the bottle 930 in place for imaging. In another example, the bracket 915 might be configured with a tension ring that allows the bottle 930 to be passed through the ring with the application of sufficient force, but holds the bottle 930 in place when the force is no longer applied. The image is obtained by camera 940. Camera 940 is fixed to support 910 by bracket 941. As illustrated in FIG. 10D, the camera 940 is in communication with processor 950. Processor 950 receives a polar image of the label from the bottle that is the image of the label as reflected by the mirrored interior surface of conical mirror 920. The processor 950 is programmed with instructions to map the polar image of the label to cartesian coordinates using a polar transform. The image is transformed from an image of the label as reflected by the mirrored interior surface of conical mirror 920 using a polar transform.

From the foregoing and with reference to the various figure drawings, those skilled in the art will appreciate that certain modifications can also be made to the present disclosure without departing from the scope of the same. While several embodiments of the disclosure have been shown in the drawings, it is not intended that the disclosure be limited thereto, as it is intended that the disclosure be as broad in scope as the art will allow and that the specification be read likewise. Therefore, the above description should not be construed as limiting, but merely as exemplifications of particular embodiments. Those skilled in the art will envision other modifications within the scope and spirit of the claims appended hereto.

The invention claimed is:

1. A system for obtaining an image of a cylindrical object comprising:

- a camera;
- a bracket for holding the camera;
- a conically-shaped receptacle comprising a mirrored interior surface, the conically-shaped receptacle adapted to receive the cylindrical object wherein the mirrored surface provides an annular imaging zone for the cylindrical object;
- wherein the camera is positioned such that it can capture an image of the cylindrical object when held in the conically-shaped receptacle; and
- a bracket supporting the conically-shaped receptacle, wherein the bracket has an opening through which the cylindrical object can pass.

2. The system of claim 1, wherein the cylindrical object is a bottle.

3. The system of claim 1, wherein the cylindrical object has a label thereon.

4. The system of claim 3, wherein the camera is configured to obtain an image of the label in a single frame.

5. The system of claim 4, wherein the camera is in communication with a processor.

6. The system of claim 5, wherein the processor is programmed to apply a polar transform to the image of the label received from the camera.

7. The system of claim 6, wherein the processor outputs a transformed image from applying the polar transform.

8. The system of claim 1, wherein the bracket supporting the conically-shaped receptacle comprises a removable covering over the opening, the removable cover being movable from a closed position to an open position.

9. The system of claim 8, wherein the removable cover supports the cylindrical object when in the closed position.

10. The system of claim 1, wherein the conically-shaped receptacle is positioned above the camera and the camera is directed at the mirrored interior surface.

11. The system of claim 1, wherein the conically-shaped receptacle is positioned below the camera and the camera is directed at the mirrored interior surface.

12. The system of claim 1, wherein the conically-shaped receptacle comprising a mirrored interior surface tapers such that sidewalls of the mirrored surface, if extended to meet at an apex, form an angle of about 84 degrees to about 96 degrees.

13. The system of claim 12, wherein the conically-shaped receptacle comprising a mirrored interior surface tapers such that sidewalls of the mirrored surface, if extended to meet at an apex, form an angle of about 90 degrees.

14. A system for obtaining an image of a cylindrical object comprising:

a camera and lens assembly;

a bracket for holding the camera; and an auxiliary mirror module comprising an angled mirrored interior surface interposed between a cylindrical object and the camera and lens assembly, wherein the camera is positioned such that it can capture an image of the cylindrical object when placed in the auxiliary mirror module;

wherein the angled mirrored surface comprises two angled side mirrors wherein the side of the mirror facing the cylindrical object is a reflective side of the two angled side mirrors, wherein the reflective sides of the two angled side mirrors are configured to direct light from the reflective surfaces to reflective surfaces on a central angled mirror, wherein the reflective surfaces on the central angled mirror are configured to provide an enlarged field of view to direct light toward the camera and lens assembly.

15. The system for obtaining an image of a cylindrical object of claim 14, wherein the angle of the reflective side of a first angled side mirror is +45 degrees with respect to an axis from the cylindrical object to the camera and lens assembly and the angle of the reflective side of a second angled side mirror is −45 degrees with respect to an axis from the cylindrical object to the camera and lens assembly.

16. The system for obtaining an image of a cylindrical object of claim 15, wherein the central angled mirror comprises a first angled reflective surface and a second angled reflective surface wherein the first and second angled reflective surfaces are at +45 degrees and −45 degrees, respectively.

17. The system for obtaining an image of a cylindrical object of claim 14, wherein the angle of the reflective side of a first angled side mirror is +37 degrees with respect to an axis from the cylindrical object to the camera and lens assembly and the angle of the reflective side of a second angled side mirror is −37 degrees with respect to an axis from the cylindrical object to the camera and lens assembly.

18. The system for obtaining an image of a cylindrical object of claim 17, wherein the central angled mirror comprises a first angled reflective surface and a second angled reflective surface wherein the first and second angled reflective surfaces are at +45 degrees and −45 degrees, respectively.

19. The system for obtaining an image of a cylindrical object of claim 14, wherein the angle of the reflective side of a first angled side mirror is +35 degrees with respect to an axis from the cylindrical object to the camera and lens assembly and the angle of the reflective side of a second angled side mirror is −35 degrees with respect to an axis from the cylindrical object to the camera and lens assembly.

20. The system for obtaining an image of a cylindrical object of claim 19, wherein the central angled mirror comprises a first angled reflective surface and a second angled reflective surface wherein the first and second angled reflective surfaces are at +45 degrees and −45 degrees, respectively.

21. The system for obtaining an image of a cylindrical object of claim 14, wherein the cylindrical object is a bottle.

22. The system for obtaining an image of a cylindrical object of claim 14, wherein the cylindrical object has a label thereon.

23. A method for obtaining an image of a cylindrical object, the method comprising:

positioning a cylindrical object in a conically-shaped receptacle, wherein the conically-shaped receptacle has a mirrored interior surface such that the mirrored surface provides an annular imaging zone of the cylindrical object;

obtaining a digital image of the cylindrical object as reflected from the mirrored surface of the conically-shaped receptacle;

transmitting the digital image to a processor;

applying a polar transform to the digital image; and outputting the transformed image for analysis.

24. The method of claim 23, wherein the image is obtained using a camera.

25. The method of claim 23, wherein the cylindrical object is a bottle.

26. The method of claim 25, wherein the bottle has a label thereon.

27. The method of claim 24, wherein the camera obtains an image of an entire circumference of the cylindrical object in one frame.

* * * * *